April 12, 1932.   T. C. OLESEN   1,853,991
MOTOR MOUNTING
Filed Jan. 21, 1929   3 Sheets-Sheet 1
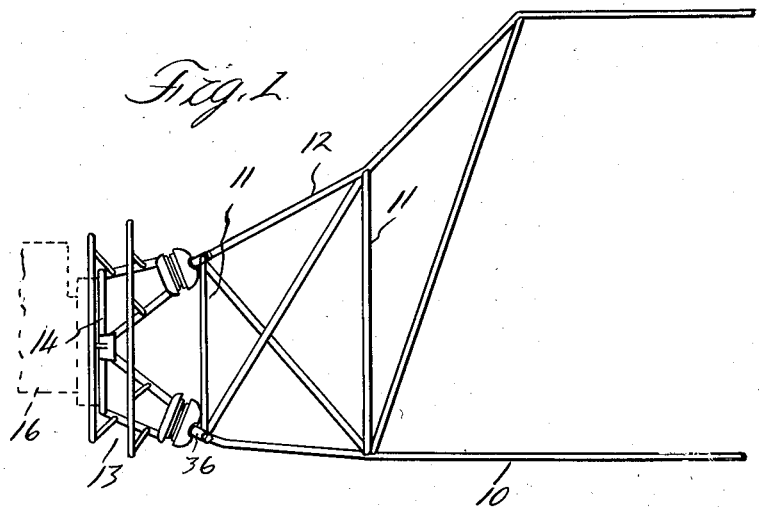
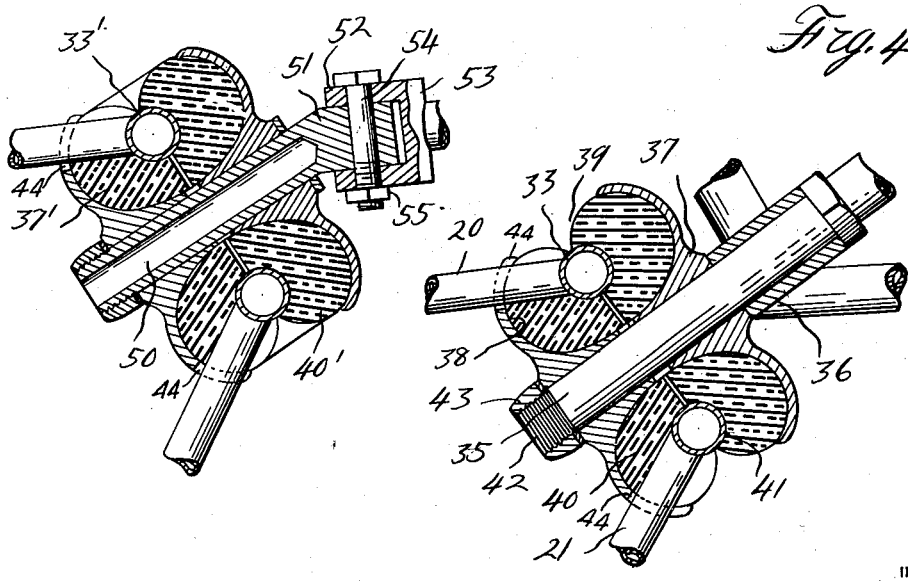
INVENTOR
Tage C. Olesen
BY
ATTORNEYS April 12, 1932. T. C. OLESEN 1,853,991
MOTOR MOUNTING
Filed Jan. 21, 1929 3 Sheets-Sheet 2
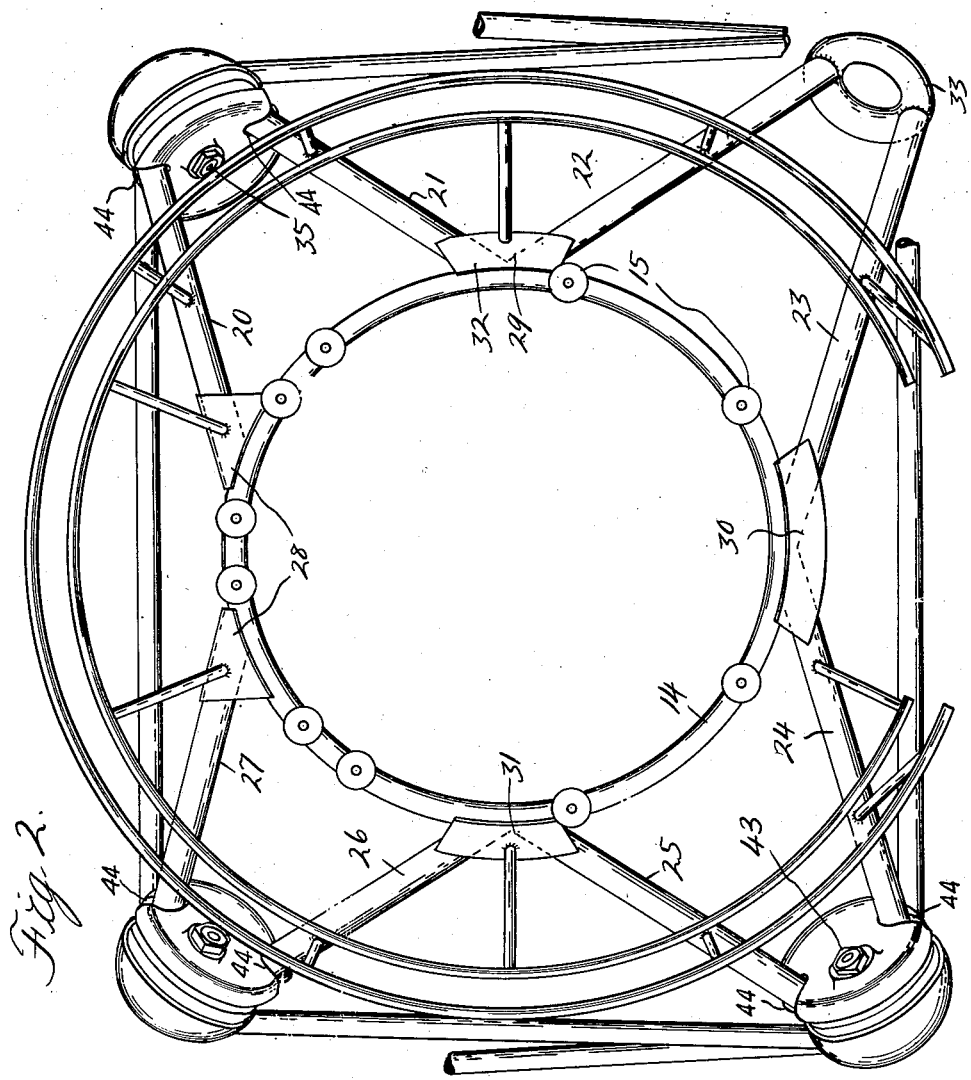
INVENTOR
Tage C. Olesen
BY
ATTORNEYS April 12, 1932. T. C. OLESEN 1,853,991
MOTOR MOUNTING
Filed Jan. 21, 1929 3 Sheets-Sheet 3
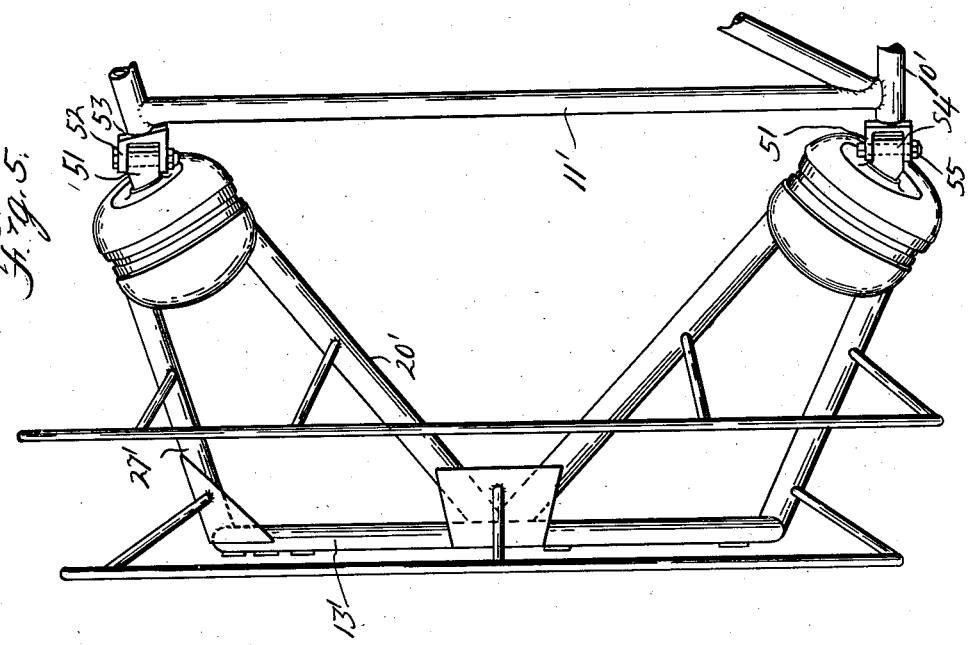
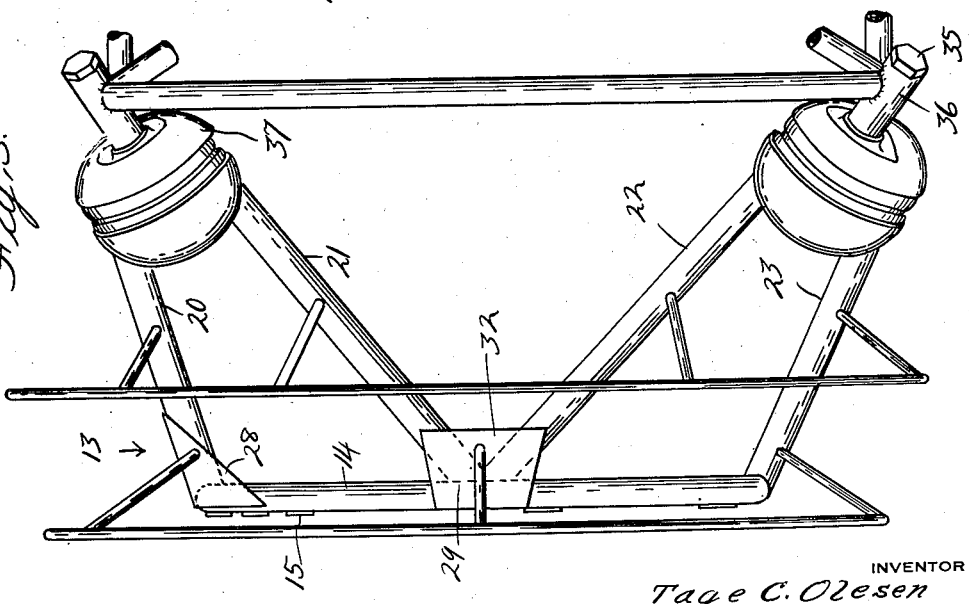
INVENTOR
Tage C. Olesen Patented Apr. 12, 1932

1,853,991

UNITED STATES PATENT OFFICE

TAGE C. OLESEN, OF NORTHVILLE, MICHIGAN, ASSIGNOR TO STINSON AIRCRAFT CORPORATION, OF NORTHVILLE, MICHIGAN, A CORPORATION OF MICHIGAN

MOTOR MOUNTING

Application filed January 21, 1929. Serial No. 333,968.

The invention relates generally to motor supports or mountings and has for its primary object the provision of means for connecting the motor supporting frame of an airplane to the fuselage, that while possessing the requisite rigidity to properly support the motor will allow sufficient movement between the parts to absorb the shocks and strains normally transmitted by the motor.

Other objects and advantages of this invention as well as the numerous novel details of construction will become more apparent as the following description proceeds, particularly when reference is had to the accompanying drawings wherein:

Figure 1 is a semi-diagrammatic fragmentary elevational view of an airplane showing the invention applied to the same;

Figure 2 is a front elevational view of the motor supporting frame shown in Figure 1 showing the connection of this frame to the fuselage;

Figure 3 is an elevational view of the structure shown in Figure 2;

Figure 4 is a fragmentary sectional view through a portion of the structure shown in Figure 3;

Figure 5 is a view similar to Figure 3 showing a slightly modified form of construction; and Figure 6 is a view similar to Figure 4 through the modified form of construction.

Referring now particularly to the drawings wherein like reference characters designate corresponding parts throughout all views, there is fragmentarily illustrated in Figure 1 an airplane having the fuselage or main frame 10. This may terminate at its forward end in a substantially rectangular frame 11, the frame bars 12 of the fuselage extending rearwardly from this frame and being connected to the same at the four corners as clearly illustrated in the drawings.

The numeral 13 designates generally a motor supporting frame including a ring 14 and a connecting framework between this ring and the fuselage. The ring is provided with a plurality of spaced mounting lugs 15 to which the motor 16 may be bolted.

The connecting framework includes the supporting arms 20 to 27 inclusive, arranged in pairs and secured to the ring at the spaced points 28, 29, 30 and 31 in any desired manner as by welding or the like. These arms extend rearwardly from the ring and the adjacent arms of adjacent pairs of arms terminate adjacent the same corner of the frame 11. For bracing the connections between the arms and the ring, suitable gusset plates 32 may be provided, which engage both the arms and the ring as will be readily apparent by reference to Figure 2 of the drawings.

The two arms which terminate adjacent the same corner of the forward end of the fuselage are secured to opposite sides of a supporting ring 33. There are four such supporting rings and the present invention contemplates in particular the provision of means for yieldably connecting these rings to the four corners of the frame 11, while providing sufficient rigidity at these connections to support the entire motor frame 13.

As shown in Figure 4 of the drawings, there is provided at each corner of the frame 11, a forward extension 35, such as a bolt mounted in a tubular member 36 secured in any desired manner to the corner of the frame. Detachably mounted on the bolt are annular clamping members 37, complementary in form and provided on their opposing faces with the annular recesses 38 which cooperate to form a housing 39. Arranged between the clamping members are annular resilient members 40 which as illustrated may be rubber blocks having their faces shaped to fit within the recesses in the clamping members. These blocks have their opposing faces recessed as at 41 to form an annular recess to receive the supporting ring 33. For locking the bolt in position in the tubular member 36 and for also forcing the clamping members toward each other to firmly clamp the ring 33 between the rubber blocks, the free end of the bolt is threaded as at 42 to receive a nut 43 adapted to bear against the outer end of the outermost clamping member.

From the above, it is believed that the invention will be clearly apparent. Each ring 33 is yieldably supported in its respective housing 39 between the rubber blocks 40. A pair of supporting arms are secured to each ring 33 and these arms are secured to and support the ring 14. Thus it will be seen that the entire motor supporting frame 13 will be connected to the front of the fuselage by yielding connections which will offer sufficient rigidity to support the motor and at the same time allow a slight relative movement. By virtue of the fact that there is no metallic contact between the motor supporting frame and the fuselage, all vibrations regardless of their plane will be prevented from passing to the fuselage and all of the shocks and jars imparted to the motor supporting frame will be absorbed by the yielding connections. As illustrated in Figure 2 of the drawings the outer of the two clamping members at each connection, may be provided with a pair of recesses 44 of sufficient size to receive the supporting arms without permitting a metal to metal contact.

In Figures 5 and 6 a slightly modified form of construction is disclosed. The modification consists in the provision of means for hingedly securing the yieldable connections to the fuselage, whereby when certain of the connections are released the motor supporting frame may be swung upon the other connections as hinges to permit access to the front of the fuselage. Referring then particularly to these figures, it wil be noted that the fuselage 10', frame 11' and motor supporting frame 13' are identical in construction with that above described. Further it will be noted that the motor supporting frame includes the arms 20' to 27' which are secured in pairs to rings 33' mounted between rubber blocks 40' clamped between clamping members 37'.

In this form of construction, however, the clamping members 37' instead of being mounted on bolts, are rather mounted in the same manner on pins 50, which terminate at their inner ends in angularly bent base portions 51. Each base portion is mounted between the ears 52 of a fitting 53 rigidly secured to one corner of the frame 11 and the ears 52 and base portion 51 are apertured to receive a pin 54. This pin forms a hinge about which the pin 50 may be swung and is detachably held in place by a nut 55.

From the above it is believed that the structure and operation of this form of the invention will be also clearly apparent. The motor supporting frame will be yieldably supported from the fuselage in the manner as brought out above. Further when all of the hinge pins are secured in position by the respective nuts, the rigidity of the motor supporting frame will prevent a swinging of this frame on the hinge pins relative to the fuselage. When, however, it is desired to swing the motor supporting frame out of the way to permit access to the forward end of the fuselage, two of the hinge pins on one side of the frame may be removed whereupon the entire motor supporting frame may be swung on the other two hinge pins at the opposite side of the fame so that the entire motor supporting frame may be swung to one side of and away from the front of the fuselage.

From the above, it will be obvious that the invention provides means for yieldably connecting a motor supporting frame to a fuselage to prevent the transmission of shocks and jars from the motor supporting frame to the fuselage. While the invention has been described with considerable detail, it is to be clearly understood that the description is for the purposes of illustration only and that the right is reserved to make such changes in the details of construction and arrangement of parts as will fall within the purview of the attached claims.

What I claim as my invention is:

1. In an airplane, a motor supporting member, supporting arms for said member, a fuselage, housings secured at spaced points to said fuselage, and means for yieldably supporting a plurality of said arms in each of said housings while preventing direct contact of said arms with said fuselage.

2. In an airplane, a motor supporting ring, a pair of supporting arms for said ring, said arms terminating in an annular member, a fuselage, a housing carried by said fuselage, and means for yieldably supporting said annular member in said housing.

3. In an airplane, a motor supporting member, a fuselage, and means for yieldably supporting said member from said fuselage, said means including a pin secured to said fuselage, clamping members detachably mounted on said pin, yieldable members between said clamping members, supporting arms for said motor supporting member and a ring secured to a plurality of the said arms, said ring being adapted to be clamped between the said yieldable members.

4. In a motor mounting, a motor supporting ring, a pair of supporting arms for said ring, said arms terminating in an annular member, a main supporting frame, a housing carried by said main supporting frame, and means for yieldably supporting said annular member in said housing.

5. In a motor mounting, a motor supporting frame, a plurality of supporting arms for said frame, said supporting arms being arranged in pairs and the arms of each pair terminating adjacent each other, an annular member connecting the adjacent ends of the arms of each pair of supporting arms, a main supporting frame, a plurality of housings carried by said main supporting frame, each housing being arranged to enclose one of said annular members, and means for yieldably supporting each annular member in one of said housings.

In testimony whereof I affix my signature.

TAGE C. OLESEN.